United States Patent [19]

Sakurai et al.

[11] 4,422,699
[45] Dec. 27, 1983

[54] ELECTRICAL CONNECTOR DEVICE IN A VEHICULAR STEERING SYSTEM

[75] Inventors: Yoshimi Sakurai, Tanashi; Yutaka Shinoda; Hideo Nagata, both of Hiratsuka, all of Japan

[73] Assignee: Honda Giken Kogyo Kabushiki Kaisha & Furukawa Electric Co., Ltd., Tokyo, Japan

[21] Appl. No.: 309,441

[22] Filed: Oct. 7, 1981

[30] Foreign Application Priority Data

Oct. 7, 1980 [JP] Japan .................................. 55-140241
Oct. 7, 1980 [JP] Japan .................................. 55-140242
Oct. 7, 1980 [JP] Japan .................................. 55-140244

[51] Int. Cl.³ .......................................... H01R 39/32
[52] U.S. Cl. .................................................. 339/3 S
[58] Field of Search ................................ 339/3 R, 3 S

[56] References Cited

U.S. PATENT DOCUMENTS 3,525,536 8/1970 Pruneski .............................. 339/3 S
4,157,854 6/1979 Beauch ................................. 339/3 S Primary Examiner—Eugene F. Desmond
Attorney, Agent, or Firm—Irving M. Weiner; Pamela S. Burt; John L. Shortley

[57] ABSTRACT

An electrical connector device providing electrical connections in an electrical circuit for an air bag system, between a rotatable member including a steering wheel and a steering shaft and a fixed member including a steering column. The connector device comprises a movable casing for rotation with the rotatable member, a stationary casing fixedly supported by the fixed member, two chambers defined between the movable and stationary casings and separated radially from each other, an electrical conductor housed in one of the chambers and having one end connected to a terminal on the movable casing and the other end connected to a terminal on the stationary casing, the electrical conductor allowing relative rotation between the movable and stationary casings, and a slip ring and a brush housed in the other chamber and fixed to the stationary and movable casings, respectively. With this arrangement, stable and reliable electrical connection is assured for a long period of time and in a plurality of electrical circuits with a minimum of parts and a simple structure. To permit axial movement of the steering shaft as combined with a power steering mechanism of the rack-and-pinion type, the movable casing is axially movable with respect to the rotatable member, but axially immovable with respect to the stationary casing.

4 Claims, 7 Drawing Figures

ELECTRICAL CONNECTOR DEVICE IN A VEHICULAR STEERING SYSTEM

BACKGROUND OF THE INVENTION

1. Field of the Invention

The present invention relates to an electrical connector device for use in a vehicular steering system, and more particularly to an electrical connector device for electrically connecting an actuator for an air bag system to a collision sensor between relatively rotatable members of a steering system.

2. Description of the Prior Art

There have been known air bag systems which include an air bag normally collapsed to be housed in a steering wheel or another vehicular member and inflatable to provide cushioning against damaging impacts which passengers would otherwise be subjected to in an automobile accident. Such air bag systems also include a collision sensor which is attached to a vehicle frame and, upon detection of a vehicle collision requiring air bag inflation, delivers a signal to an actuator for detonating an explosive in order to release or produce a pressurized gas which, together with air, is introduced into the air bag to inflate the latter.

The air bag is normally housed centrally in the steering wheel with the actuator and gas generator disposed adjacent to the air bag. Because the steering wheel and steering shaft are rotatable with respect to the vehicle frame, the collision sensor and the actuator are required to be electrically connected to each other by a suitable electrical connector means which provides electrical connection between mutually rotatable members.

One known such connector means comprises a slip ring mechanism including a slip ring and a brush which are movable relative to each other and held in frictional contact with each other. The slip ring and brush assembly, however, tends to wear through repeated use, tends to fail to provide good electrical contact, and hence is unable to operate stably for a long period of time. The known mechanism is also disadvantageous in that abrasive contact between the brush and the slip ring causes wearing thereof into metal powder which is liable to cause short-circuiting, the brush and slip ring assembly generates noise signals which adversely affect a supplied pulse signal and hence invite malfunctioning of the air bag system, and there is a tendency to produce sparks between the brush and the slip ring. The connector device suffering from these difficulties is not considered optimum for use with the air bag system which is a most important safety device that is required to be absolutely reliable and stable in operation.

On the steering wheel there are also mounted actuator switches for actuating horns or alarming devices. An electrical connector for such actuator switches, when disposed separately from the connector device for the air bag system, would require additional parts for attachment, would be complicated in structure, and could not be assembled with ease.

The connector device disposed between the relatively rotatable members is necessarily constructed of a rotatable component supported on the rotatable member including a steering wheel and a steering shaft and a stationary component supported on the fixed member such as a steering column. Where the steering assembly is equipped with a power steering mechanism of the rack-and-pinion type rotational power of the steering wheel produces an axial thrusting force acting on the steering shaft by a helical angle between a pinion on a lower end of the steering shaft and a rack held in mesh with the pinion, whereupon the rotatable member is caused to move slightly upwardly with respect to the fixed member. Therefore, the connector device should allow relative axial movement of the mutually rotatable members between which the connector device is disposed.

SUMMARY OF THE INVENTION

According to the present invention, there is provided an electrical connector device in combination with a steering system having a rotatable member including a steering wheel and a steering shaft, and a fixed member including a steering column. The connector device comprises: a movable casing supported on the rotatable member for rotation therewith and disposed around the steering shaft, the movable casing having a first terminal; a stationary casing fixedly supported on the fixed member and disposed around the steering shaft, the stationary casing having a second terminal; at least one chamber defined between the movable and stationary casings; and an electrical conductor coiled in a plurality of convolutions in the chamber around the steering shaft and connected at one end to the first terminal and at the other end to the second terminal. The electrical connector device includes a second chamber defined between the movable and stationary casings and separated radially from the first-mentioned chamber, and a slip ring and a brush housed in the second chamber, the slip ring being connected to the stationary casing, and the brush being connected to the movable casing, whereby the electrical conductor and the slip ring and brush can provide electrical connections in different electrical circuits. The first-mentioned chamber is disposed radially inwardly of the second chamber. The electrical connector device also includes a central switching unit for controlling turn-signal lights, wipers, and headlights, the central switching unit having a casing mounted on the fixed member, and the stationary casing being supported by the casing of the central switching unit. The movable casing is axially immovable with respect to the stationary casing and axially movable with respect to the rotatable member.

It is an object of the present invention to provide an electrical connector device, for use in a vehicular steering system, which will operate stably and reliably over a long period of time for actuating an air bag system reliably and stably.

Another object of the present invention is to provide an electrical connector device for use with a vehicular steering system, having a plurality of connector means for providing electrical connection in a plurality of electrical circuits between relatively rotatable members of the steering system, so that the connector device comprises a smaller number of parts, is of a simplified contruction, and can be assembled more easily than would be possible if separate connector devices were provided for the circuits used.

Still another object of the present invention is to provide an electrical connector device for use with a vehicular steering system, which has a reduced number of parts and conserves space by being mounted on an existing member attached to a steering column.

Still another object of the present invention is to provide an electrical connector device for use with a vehicular steering system including a power steering mechanism of the rack-and-pinion type, the connector device allowing axial movement of a steering shaft while providing reliable and stable electric connection between relatively rotatable members of the steering system.

The above and other features, objects and advantages of the present invention will become more apparent from the following description when taken in conjunction with the accompanying drawings in which a preferred embodiment of the present invention is shown by way of illustrative example.

DETAILED DESCRIPTION

Figure 1:
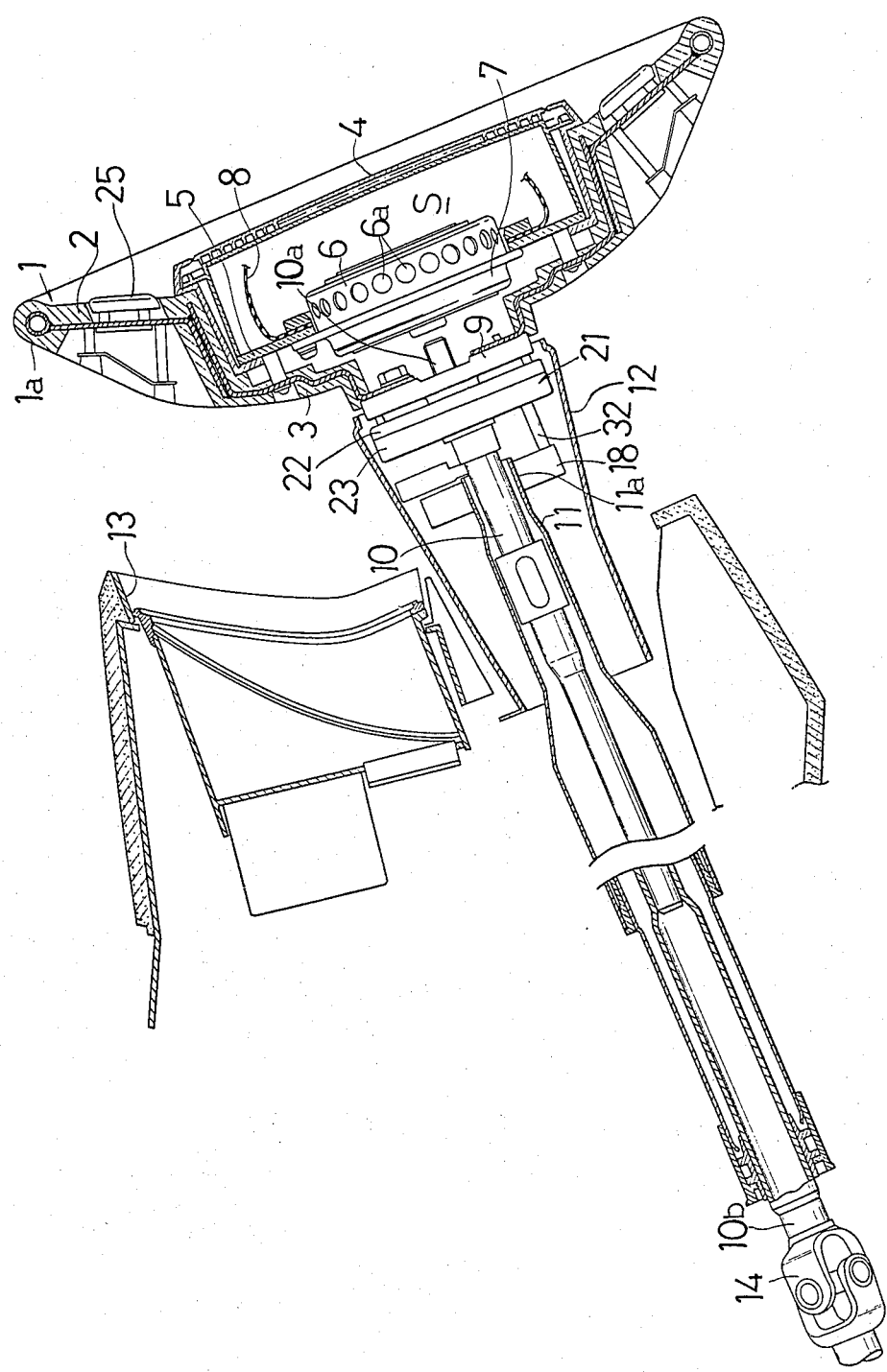
FIG. 1 is a longitudinal cross-sectional view of a steering system having an electrical connector device according to the present invention, the view being illustrative of a steering shaft extending through an instrument panel, a steering wheel mounted on the steering shaft, and other associated parts.
Figure 2:
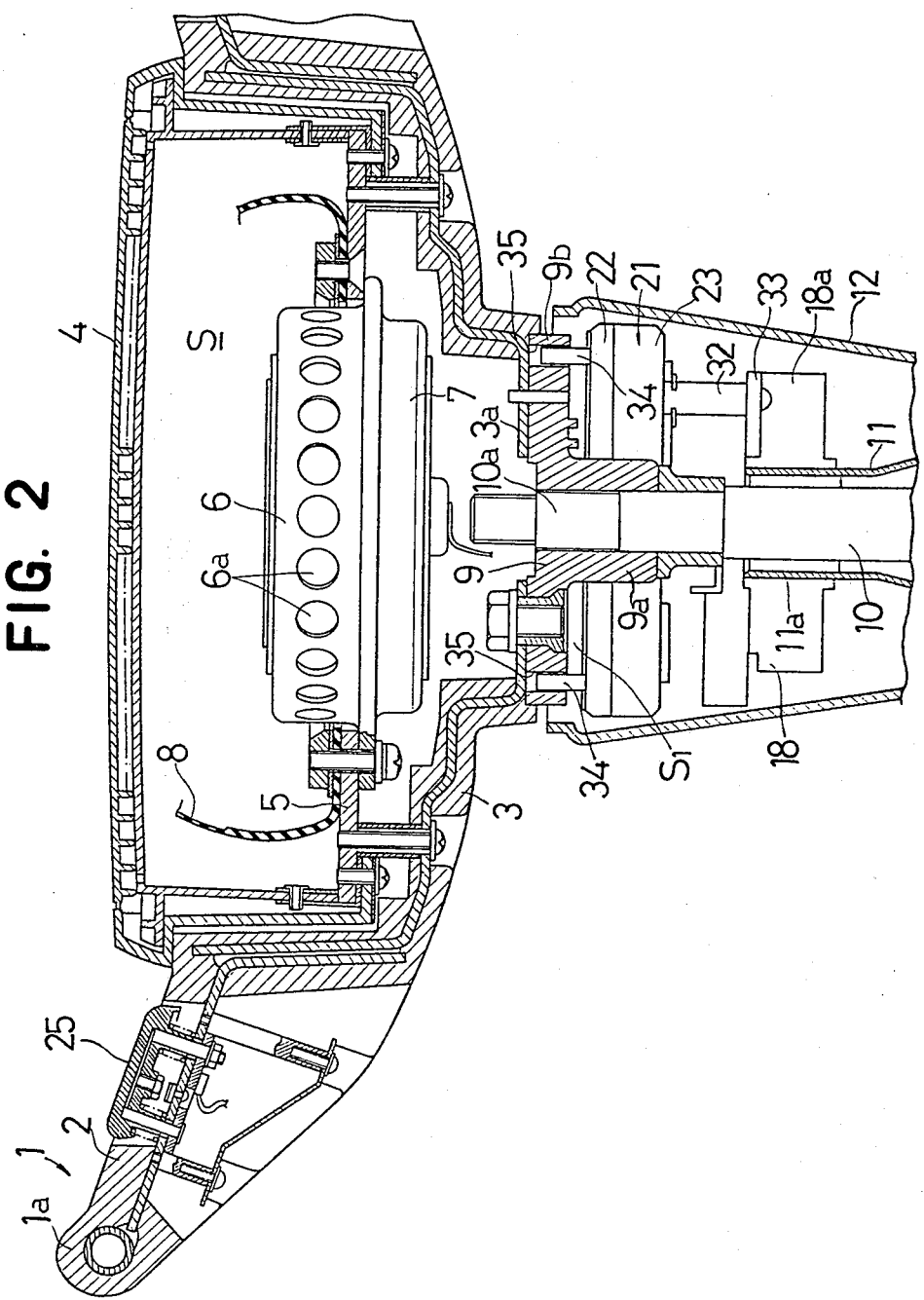
FIG. 2 is a fragmentary enlarged cross-sectional view of a central portion of the steering system shown in FIG. 1.
Figure 3:
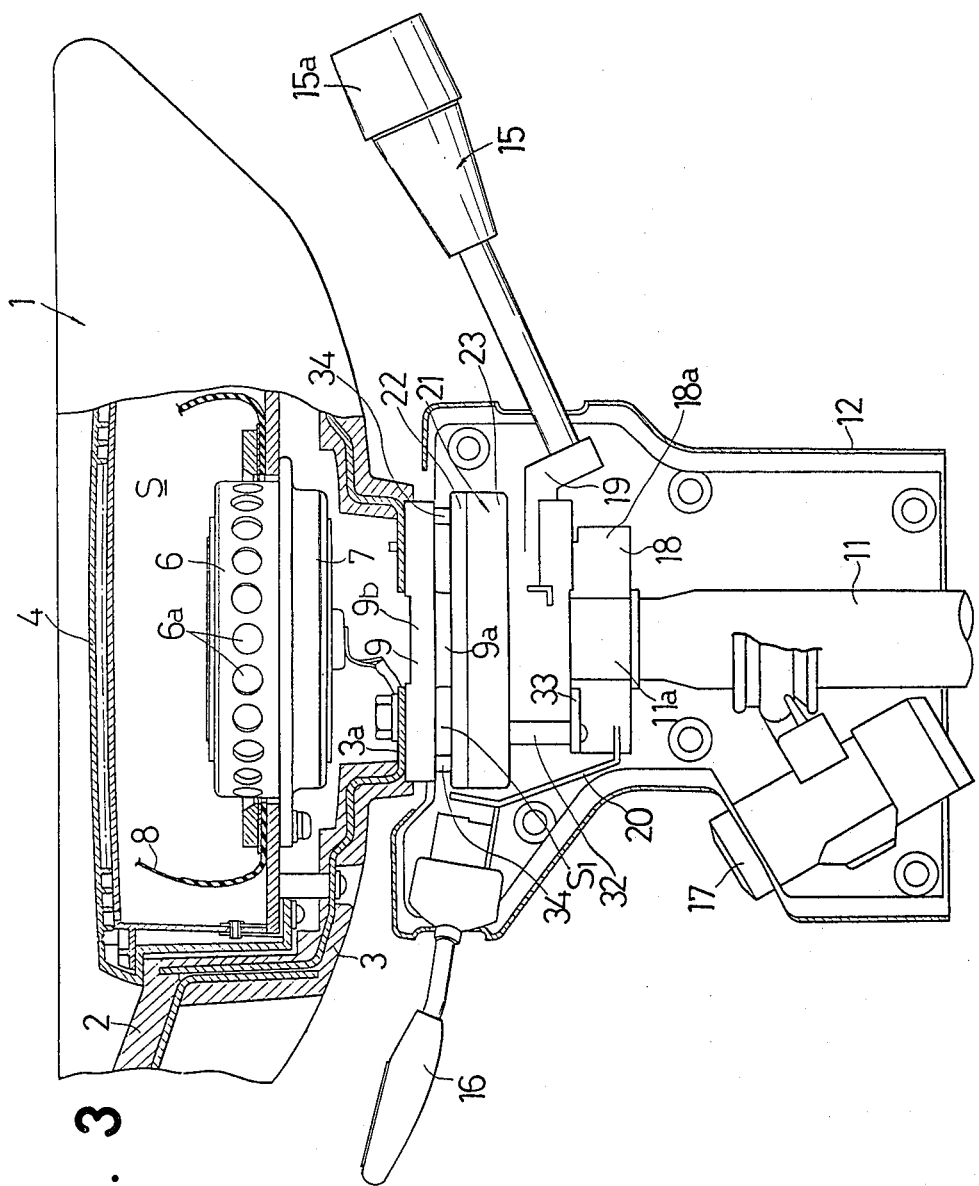
FIG. 3 is a fragmentary plan view, with parts in cross section, of the steering system of FIG. 2.

As shown in FIGS. 1 through 3, a steering wheel 1 comprises an annular wheel member 1a connected by a plurality of radial spokes 2 to a central concave member 3 located radially inwardly of the annular wheel member 1a, the central concave member 3 being covered with a pad 4. A gas generator 6 having nozzles 6a is mounted centrally on a base 5 which is supported on a bottom of the central concave member 3 and disposed in a space S in the latter. The gas generator 6 comprises a gas cylinder (not shown) which is releasable to discharge or produce pressurized gas by an actuator 7 disposed below the gas generator 6 in response to a signal supplied from a collision sensor (not illustrated) to the actuator 7. An air bag 8 in a collapsed condition is housed in the space S above te gas generator 6. Upon introduction of the gas into the air bag 8, the latter is inflated, tears off the pad 4, and expands in front of the driver to dampen the shock or impact which the driver would otherwise be subjected to during a traffic accident.

The steering wheel 1 also includes a boss 9 comprising a cylindrical portion 9a which is fixed to an upper end 10a of a steering shaft 10, and a disk-shaped flange 9b extending radially outwardly from an upper end of the cylindrical portion 9a and fastened to a bottom 3a of the central concave member 3. Therefore, the steering wheel 1 and the steering shft 10 are coupled together by the boss 9. Rotational steering movement of the steering wheel 1 can thus be transmitted to the steering shaft 10 for steering the vehicle. The steering shaft 10 is surrounded by a steering column 11 which is fixed with respect to a vehicle frame and which projects beyond an instrumental panel 13 into a vehicle compartment, positioning the steering wheel 1 so as to be controllable by the driver. Horn energizing switches 25 are supported respectively on the spokes 2 of the steering wheel 1 and have spring-loaded pressers which, when depressed against the spring bias, close an alarm circuit to thereby cause a horn to produce an alarm sound.

The steering shaft 10 has a lower end 10b connected through a universal joint 14 to a spool in a flow control valve in a power steering mechanism of the known rack-and-pinion type. When rotational power is applied to the steering wheel 1 to turn the latter, such rotational power is converted by a helical angle between the rack and the pinion to a thrusting force tending to move the shaft 10 axially, resulting in axial movement of the spool, whereupon the steering wheel 10 is power-assisted in its steering movement.

A headlight switch actuating lever 15 is pivotably mounted on an upper portion of the steering column 11 and extends through the steering cover 12(FIG. 3). The lever 15 has a knob 15a which, when turned, causes switching between small and main lamps. When the lever 15 is pushed downwardly or pulled upwardly, a low headlight beam or a high headlight beam is selected, and when the lever 15 is positioned in between, a passing light is energizable. Clockwise or counterclockwise movement of the lever 15 causes a right or left turn-signal light to flash on and off. A wiper switch lever 16 is also pivotably mounted on the steering column and extends away from the lever 15. When the wiper switch lever 16 is turned forwardly or rearwardly, the wipers are actuated intermittently, or at a low or high speed. Downward pushing movement of the wiper switch lever 16 causes the wipers to wash the front windshield with a cleanser. The steering column 11 also supports an ignition switch 17. These switches are controlled by a central switching unit 18 mounted on an upper end portion 11a of the steering column 11 and housed in the cover 12. The central switching unit 18 comprises a casing 18a which supports on its upper surface a stay 19 for the headlight switch actuating lever 15 and on its lower surface a stay 20 for the wiper switch lever 16.

Between the switching unit 18 and the flange 9b there is defined a space extending axially of the steering shaft 10 and accommodating therein an electrical connector 21.

The electrical connector 21 comprises an upper casing 22 supported on the steering wheel 1 and a lower casing 23 supported on the steering column 11, there being electrical connecting elements (described hereinbelow) interposed between the upper and lower casings 22, 23 to provide electrical connection between the upper and lower casings 22, 23 while the upper casing 22 is rotating with the steering wheel 1 relative to the lower casing 23 fixed to the steering column 11.

Figure 4:
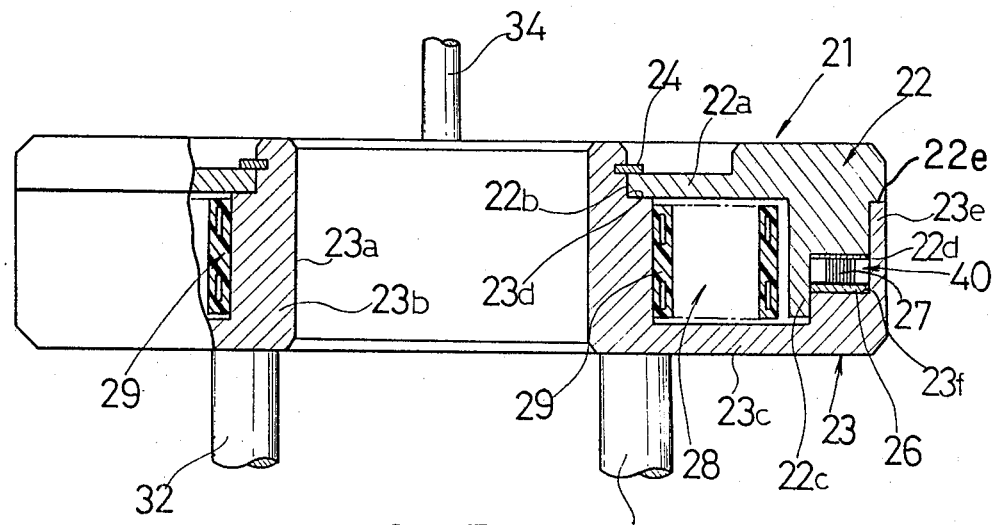
FIG. 4 is an enlarged side elevational view, partly in cross section, of an electrical connector device according to the present invention.
Figure 5:
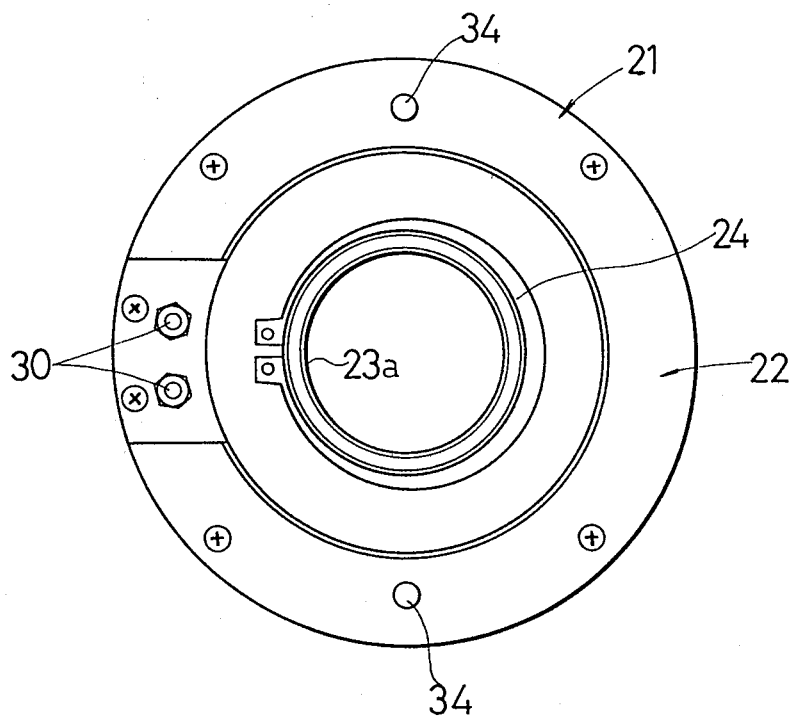
FIG. 5 is a plan view of the electrical connector device illustrated in FIG. 4.
Figure 6:
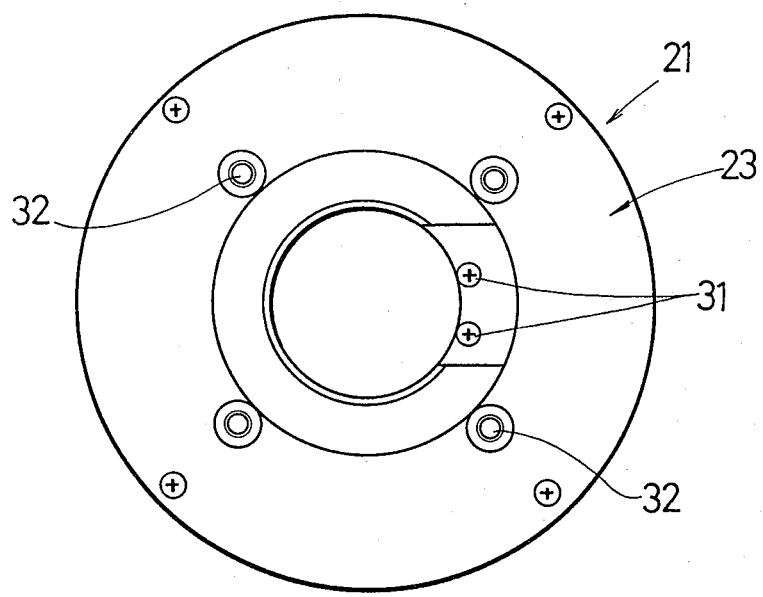
FIG. 6 is a bottom view of the electrical connector device of FIG. 4.

As illustrated in FIGS. 4 through 6, the lower casing 23 of the connector 21 has a cylindrical portion or sleeve 23b having a through hole 23a through which the cylindrical portion 9a of the boss 9 rotatably extends. The lower casing 23 includes a flange 23c extending radially outwardly from a lower end of the cylindrical portion 23b, an outer wall 23e extending upwardly from an outer periphery of the flange 23c, and a stepped portion or shoulder 23f formed radially inwardly of the outer wall 23e. The upper casing 22 comprises a radially inward flange 22a having an inner peripheral edge 22b held in engagement with a stepped portion 23d formed in an upper periphery of the cylindrical portion 23b. A clip 24 is partially embedded in the cylindrical portion 23b to hold the flange 22a of the upper casing 22 on the lower casing 23 against relative axial movement while allowing mutual rotative movement therebetween. The upper casing 22 also includes an annular partition 22c extending downwardly from an outer periphery of the flange 22a into contact with an inner surface adjacent to the stepped portion 23f, and further includes inner and outer stepped portions 22d, 22e located radially outwardly of the partition 22c and having heights different in the axial direction. The inner stepped portion 22d confronts the stepped portion 23f of the lower casing in axially spaced relation. The outer stepped portion 22e is held in sliding contact with the outer wall 23e of the lower casing 23.

Figure 7:
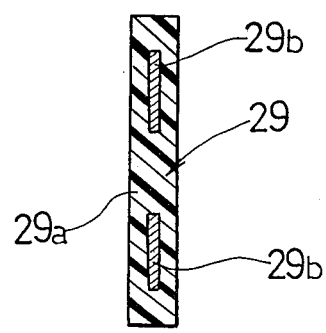
FIG. 7 is an enlarged transverse cross-sectional view of an electrical conductor employed in the electrical connector device of the present invention.

A first inner annular chamber 28 is defined between the cylindrical portion 23b, the partition 22c, and the flanges 22a, 23c and has a radial length and an axial height. The annular chamber 28 houses therein an electrical conductor 29 coiled in a plurality of layers or convolutions. The coiled conductor 29 is disposed in the chamber 28 in its free state, but allows its convolutions to be relatively movable in either winding or unwinding direction. As illustrated in FIG. 7, the conductor 29 comprises a flexible insulating tape 29a of synthetic resin having a pair of parallel strips 29b, 29b of copper embedded in and spaced widthwise of the conductor 29. The conductor 29 may alternatively be of different shapes, such as of a circular cross section. The conductor 29 has one end connected to terminals 30 (FIG. 5) mounted on the upper casing 22 for connection to the actuator 7 and the other end connected to terminals 31 (FIG. 6) supported on the lower casing 23 for connection to the collision sensor, thus completing a circuit for the air bag system. When the upper casing 22 rotates relative to the lower casing 23, the conductor 29 with its ends fixed to the casings 22, 23 is caused to be wound or unwound allowing the upper and lower casings 22, 23 to relatively rotate while assuring electrical connection between the actuator 7 and the collision sensor.

A second outer annular chamber 40 is defined between the partition 22c, the stepped portions 22d, 23f, and the outer wall 23e and is located radially outwardly of the first inner annular chamber 28, the second chamber 40 being separated from the first chamber 28 by the partition 22c. The second annular chamber 40 accommodates therein a slip ring 26 and a brush 27, the slip ring 26 being secured to the stepped portion 23f which serves as a bottom of the second annular chamber 40 and the brush 27 being affixed to the stepped portion 22d or a ceiling of the second annular chamber 40. As the upper casing 22 rotates with respect to the lower casing 23, the brush 27 is caused to move in frictional contact with the slip ring 26. The brush 27 is electrically connected to the horn switches 25 (FIGS. 1 and 2), and the slip ring 26 is electrically connected to the horns and a power supply therefor. Thus, when one or both of the horn switches 25 are depressed, a circuit is completed to energize the horns.

A plurality of attachment rods 32 project downwardly from a bottom of the lower casing 23 and are fastened to attachment plates 33 (FIG. 2) mounted on a top of the casing 18a of the central switching unit 18. With this arrangement, no separate bracket is required for attaching the lower casing 23 to the steering column 11, and hence the number of parts used is not increased.

Because no such bracket is used, the procedure for attaching the lower casing 23 is relatively simple, and there is no need for a space to be taken up by such bracket.

A plurality of attachment rods 34 project upwardly from the upper casing 22 and fit in holes 35 defined in the flange 9b of the boss 9 as shown in FIG. 2. The upper casing 22 thus attached is spaced a distance $S_1$ from the boss flange 9b. Rotation of the steering wheel 1 can thus be transmitted to the upper casing 22 through the attachment rods 34.

When the steering wheel 1 is turned for steering control, the boss 9 is caused to move axially, but the upper casing 22 remains axially immovable while rotating with the steering wheel 1. The upper and lower casings 22, 23 remain attached axially to each other, maintaining electrical connection at all times between the actuator 7 and the collision sensor and between the horn switches 25 and the horns.

While in the illustrated embodiment the single conductor 29 has been shown, a plurality of such conductors may be housed in the chamber 28. The slip ring 26 and the brush 27 may be housed in a radially inward, smaller chamber, and the conductor 29 may be housed in a radially outward, larger chamber. However, the conductor 29 as coiled in the radially inward chamber 28 has a relatively small diameter of the coil and is relatively short. The present invention is not limited to the electrical connector for the air bag system as illustrated, but is applicable to other electrical connectors for various electrical equipment mounted on the steering wheel.

The electrical conductor 29 is connected at all times to the terminals on the rotatable and non-rotatable parts and is subjected only to winding and unwinding movement while the rotatable part rotates, thus assuring continued, stable and reliable electrical connection. Such an electrical connection arrangement is particularly advantageous for application such as in an air bag system, which require absolute reliability in operation. The connector device is also advantageous in that a plurality of connectors may be used to provide electrical connection for multiple circuits, the device is simple and compact in construction, is a space saver, is made up of a reduced number of parts, and can be assembled easily and attached to existing parts. The connector device according to the invention produces no noise or sparks, and is free of malfunctioning, which features render the device ideal for use with air bag systems. The connector device further incorporates therein the slip ring and brush assembly located radially outwardly of the conductor and separated therefrom by the partition, the slip ring and brush assembly providing electrical connection in a horn circuit which requires a normal degree of reliability and safety. Thus, the single connector device provides a simple and inexpensive arrangement which assures electrical connections in a plurality of circuits between relatively movable parts. Where the connector device of the present invention is used with a steering wheel combined with a power steering mechanism, the connector device allows axial movement of a steering shaft and wheel while maintaining electrical connection between moving and fixed parts.

Although a certain preferred embodiment has been shown and described in detail, it should be understood that many changes and modifications may be made therein without departing from the scope of the appended claims.

What is claimed is:

1. An electrical connector device in combination with a steering system having a rotatable member including a steering wheel and a steering shaft, and a fixed member including a steering column, said connector device comprising:
   a movable casing supported on said rotatable member for rotation therewith said disposed around said steering shaft, said movable casing having a first terminal;
   a stationary casing fixedly supported on said fixed member and disposed around said steering shaft, said stationary casing having a second terminal;
   at least one chamber defined between said movable and stationary casings;
   an electrical conductor coiled in a plurality of convolutions in said chamber around said steering shaft and connected at one end thereof to said first terminal and at the other end thereof to said second terminal; and
   said movable casing being axially immovable with respect to said stationary casing and axially movable with respect to said rotatable member.

2. An electrical connector device according to claim 1, including a second chamber defined between said movable and stationary casings and separated radially from said at least one chamber, and a slip ring and a brush housed in said second chamber, said slip ring being connected to said stationary casing, and said brush being connected to said movable casing, whereby said electrical conductor and said slip ring and brush can provide electrical connections in different electrical circuits.

3. An electrical connector device according to claim 2, wherein said at least one chamber is disposed radially inwardly of said second chamber.

4. An electrical connector device according to claim 1, including a central switching unit for controlling turn-signal lights, wipers, and headlights, said central switching unit having a casing mounted on said fixed member, and said stationary casing being supported by said casing of said central switching unit.

* * * * *